United States Patent [19]

Eiermann

[11] Patent Number: 4,584,214
[45] Date of Patent: Apr. 22, 1986

[54] FIREPROOF COVERING

[75] Inventor: Horst W. Eiermann, Basel, Switzerland

[73] Assignees: PCT Pyrochemtek AG, Switzerland; Rockwool AB, Sweden; Chemische Fabrik Grunau GmbH, Fed. Rep. of Germany

[21] Appl. No.: 622,864

[22] Filed: Jun. 20, 1984

Related U.S. Application Data

[63] Continuation-in-part of Ser. No. 370,664, Apr. 22, 1982, abandoned.

[30] Foreign Application Priority Data

Apr. 22, 1981 [DE] Fed. Rep. of Germany ... 8111976[U]
Mar. 11, 1982 [DE] Fed. Rep. of Germany ....... 3208890

[51] Int. Cl.⁴ ............................ B32B 27/00; H01B 7/28
[52] U.S. Cl. ....................................... 428/35; 428/289; 174/99 R; 174/121 A
[58] Field of Search ......................... 174/99 R, 121 A; 428/35, 289–291

[56] References Cited

U.S. PATENT DOCUMENTS

| | | | |
|---|---|---|---|
| 2,991,807 | 7/1961 | Turner | 138/113 |
| 3,642,531 | 2/1972 | Peterson | 117/218 |
| 3,928,714 | 12/1975 | Matchett | 174/47 |
| 4,064,359 | 12/1977 | Peterson et al. | 174/107 |
| 4,189,619 | 2/1980 | Pedlow | 174/48 |

FOREIGN PATENT DOCUMENTS 2039969 8/1974 Fed. Rep. of Germany .

Primary Examiner—John E. Kittle
Assistant Examiner—James J. Seidleck
Attorney, Agent, or Firm—Steele, Gould & Fried

[57] ABSTRACT

A fireproof covering for protecting heat-sensitive material and structures, said covering comprising: preshaped mineral wool components, molded to rigid, substantially self-supporting forms with a binder, for surrounding the heat-sensitive material and structures; and, a fireproof coating at least on the outside of the rigid mineral wool components, the coating progressively sintering onto the surface of the rigid mineral wool components under fire conditions and supporting the components as the binder progressively decomposes, whereby heat-sensitive material and structures can be protected from fire conditions for extended periods of time.

30 Claims, 29 Drawing Figures

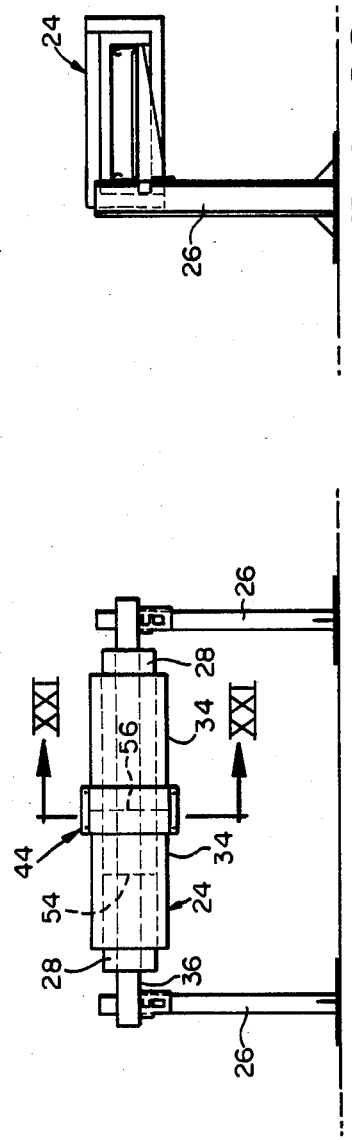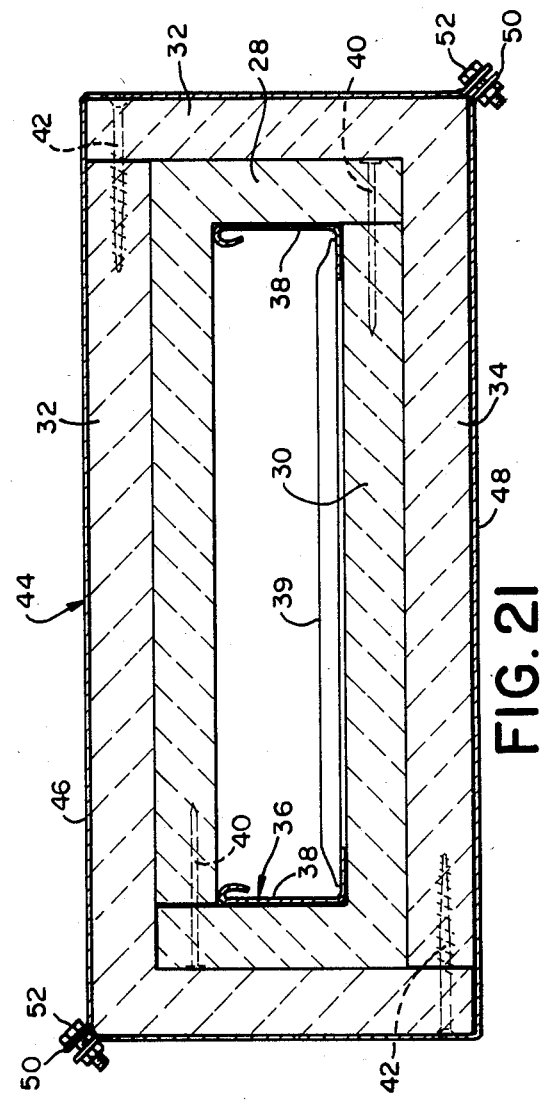

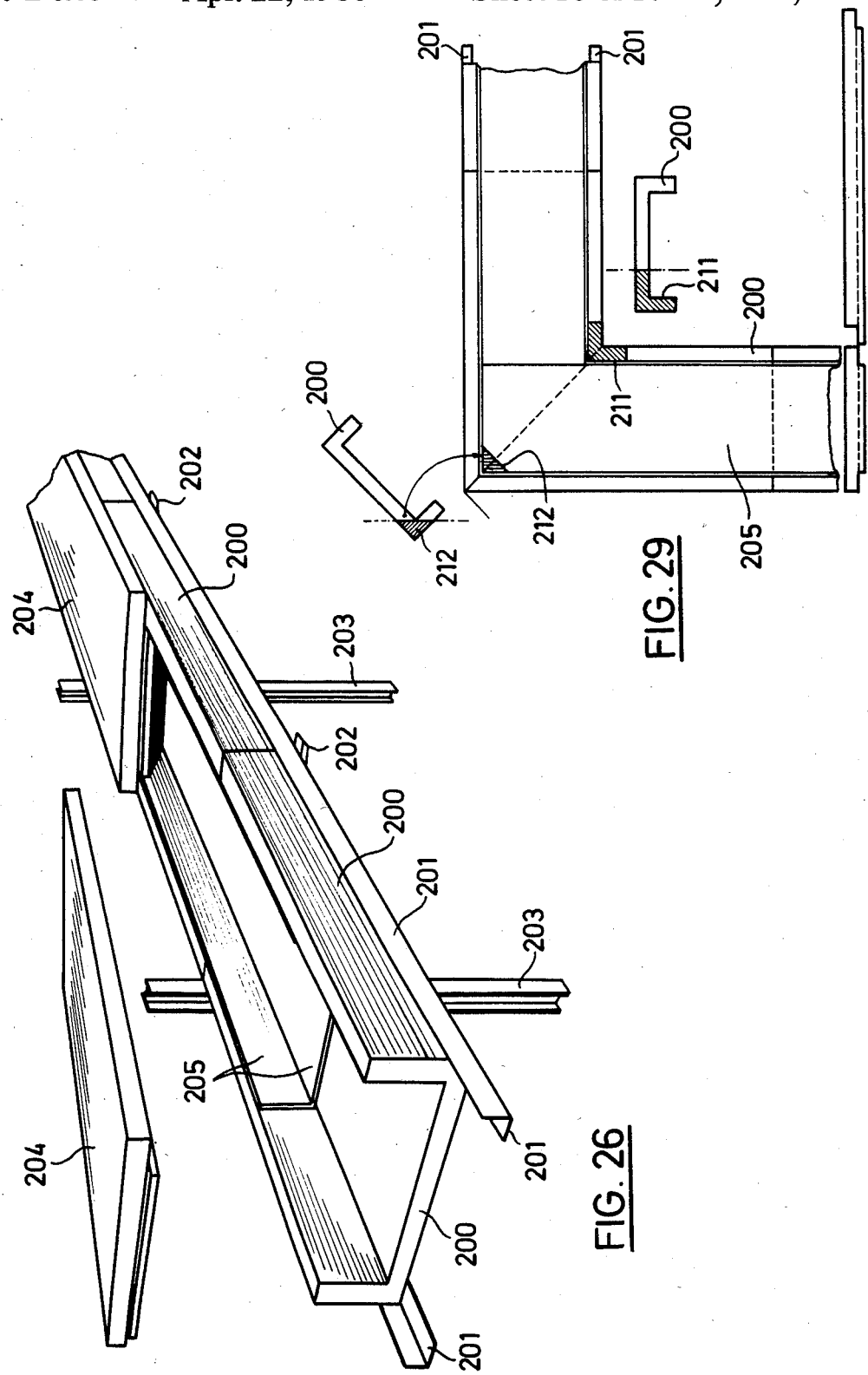

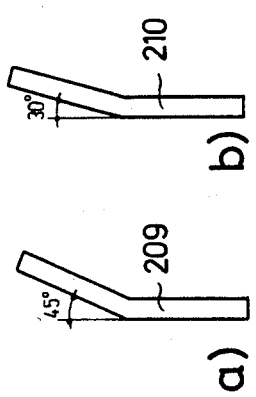
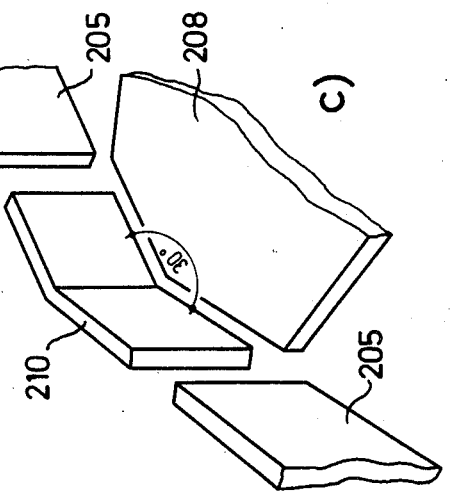
FIG. 28
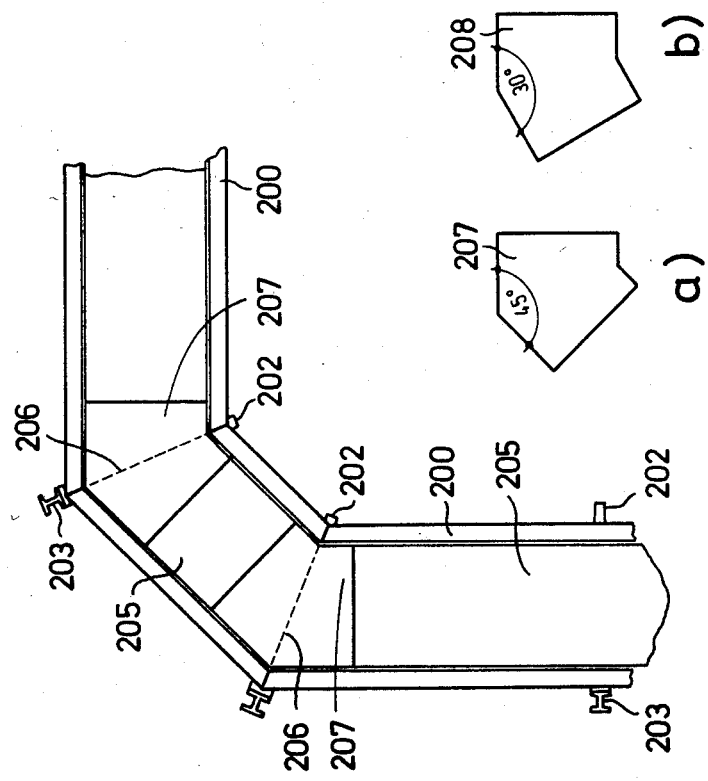
FIG. 27

FIREPROOF COVERING

CROSS-REFERENCE TO RELATED APPLICATIONS

This application is a continuation-in-part application of co-pending application Ser. No. 370,664, filed Apr. 22, 1982, and now abandoned.

BACKGROUND OF THE INVENTION

1. Field of the Invention

The invention relates to the field of fireproof coverings for protecting heat-sensitive parts, and in particular, to protecting electrical cables, supporting means and the like in potentially dangerous environments such as found in petro-chemical plants.

2. Prior Art

Most electrical cables are now insulated with a plastics material. Most of the plastics materials used for cable coverings are heat-sensitive, readily flammable materials. Therefore, numerous proposals for making cables fireproof have been made. Thus, for example, it has been proposed to apply a self-quenching fireproofing agent to such cables, for example that known from German Pat. No. 2,039,969, corresponding to U.S. Pat. No. 3,642,531. However, this process is relatively complicated and costly, particularly in those cases where several juxtaposed cables must be protected against fire risks.

U.S. Pat. No. 4,064,359 discloses soft, flexible mats made of fiberglass, which possesses a relatively low heat resistance, for wrapping directly around pipes. By contrast, a coating on the flexible mat possesses a higher heat resistance. In other words, a coating containing high-melting fibers is used to compensate for the technically deficient fire-proof characteristics of fiberglass mats. The invention herein uses a similar coating, but in conjunction with rigid mineral wool panels made from hard, massive, relatively heavy, molded mineral fiber sheets. The fiber sheets are made of a hot-melting fiber material and have a much higher resistance to fire than fiberglass. The coating also improves resistance to chemical damage, impact damage and weatherproofing. However, the coating has yet another function, in that it sinters at temperatures between 700° C. and 900° C. (1290° F. and 1650° F.) and thereby provides a mechanical reinforcement of fiber structure at the surface of the mineral wool panels, the coating forming a substitute for the organic binder of the panels which decomposes when heated. Moreover, the sintered coating tends to be smoke-tight. Therefore, such a coating offers additional fire protection because it prevents or at least retards disintegration (dimmunition of volume, leaks at joints and a tendency to crumble) of the binding agent as it decomposes at temperatures above 300° C. U.S. Pat. No. 4,064,359 mentions that the glass may be mixed with a suitable molding resin to form specific shapes. It also mentions that maximum fire protection properties are obtained when the inner layer is made up entirely of glass. Apart from this general statement, which is not further elaborated or supported, the disclosure does not contain even further hints regarding the mechanical and heat resistance properties of such molded fiberglass parts.

In German Utility Model No. 73 17 104 a panel element for sealing openings in walls and ceilings is disclosed. The panel elements are made of a fiber sheet, about 3 cm. to 6 cm. thick, made of mineral wool or glass fibers, and containing a resinous binder which vaporizes at about 200° C. The panel elements are coated on both sides with a fire resistant coating. The composition of the coating can be compared with that of U.S. Pat. No. 4,064,359. No data is supplied in the Utility Model regarding the mechanical properties of the panel elements. The panel elements are not intended for forming channels for electrical ducts, but only for closing the openings.

A cable covering with a duct-like protective sheath has been proposed, which comprises two sheet steel layers, the gap between which is filled with mineral wool. However, in order to prevent corrosion in the construction of such protective sheaths, it is necessary to use stainless steel layers, or at least galvanized steel, which is expensive. In addition, metal protective sheaths require retaining devices as a result of their own weight. Such devices are relatively complicated and cannot always be properly fitted.

SUMMARY OF THE INVENTION

The object of this invention is to provide a fireproof covering, which is less expensive to manufacture and easier to fit and install, but which nevertheless protects against fire, weathering, chemical attach and mechanical impact.

According to the invention, this object is achieved by a fireproof covering comprising rigid mineral wool components with a fireproof coating, at least on the outside. Suitable mineral wool has a high softening point. Suitable examples include rock wool made from a basalt/dolomite melt or a basalt/limestone melt as well as slag wool and/or ceramic wool. The fireproof coating can advantageously be formed from an inflammable or not readily flammable fireproofing agent, which is highly resistant to weathering, chemical damage and degradation and mechanical impact. A suitable fireproof coating is disclosed in German Pat. No. 2,039,969, corresponding to U.S. Pat. No. 3,642,531, the teachings of which are incorporated herein by reference.

A fireproof covering according to this invention can be adapted to the conditions prevailing on-site, because it comprises self-supporting components requiring no separate supporting framework. Although the necessary protection is not provided by either mineral wool alone or by a fireproof coating alone, quite surprisingly, it has been found that there is a special interaction between the two components which leads to the protection necessary against high temperatures, even if the mineral wool and/or fireproof coating contains a certain percentage of organic binders, which decompose in a fire. As the temperature rise in the case of a fire is a dynamic process, it is not absolutely necessary for the covering to withstand the highest temperatures, which can be in the range of 1,000° C. It is in fact a question of delaying the heat penetration to such an extent that for the necessary time, the electrical cables or other structure disposed inside of the covering remain operative.

In the case of a fire, the mineral wool is protected by the fireproof coating. Due to its relatively high thermal conductivity, the fireproof coating more particularly compensates for local temperature differences, as well as for any inhomogeneities of the mineral wool boards or plates. In addition, heat convection through the mineral wool is prevented by the blocking fireproof coating. Surprisingly, it has been found that the mineral wool is in a position to serve as an adequately stable supporting structure for the prior fireproof coating even in the case of the binder of the coating decomposing, leading to a reduction in the mechanical stability thereof. Detailed research has not yet been conducted on the interaction, but tests under correspondingly severe conditions have revealed this reciprical assisting action between the mineral wool and the coating as the latter sinters on the surface of the panels.

Without great technical expenditure and effort, such a fireproof coating makes it possible for the cables therein to retain their operating characteristics at least until the signals for operating the safety devices, for example, safety valves, have been transmitted.

Preferably, at least some of the mineral wool components of the fireproof covering according to the invention are curved or bent in at least one direction, which largely obviates the sealing problems occurring in the case of plate-like components disposed at an angle to one another. Thus, a fireproof covering according to the invention can comprise, for example, at least two, preferably four cross-sectionally, substantially L-shaped or at least one, preferably two cross-sectionally, substantially U-shaped mineral wool components in which the object to be protected from thermal damage is placed or with which the object is covered. Such objects can include, for example, cables, supply pipes and supports. In fact, such fireproof coverings can surround almost any space in which lines are to be placed which must be protected from thermal damage.

The mineral wool components of the fireproof covering according to the invention are preferably extruded or molded parts, which are preferably molded prior to the final setting of the binder. The mineral wool components are preferably compressed in the connecting area. A stepped profile is advantageously formed. The latter more particularly applies in the case of longitudinally directed connecting areas.

The mineral wool components of the fireproof covering according to the invention are preferably impermeable, for example with respect to liquids, and in particular with respect to gases. For this purpose, such fireproof coverings preferably incorporate a metal foil layer, which preferably extends substantially over the entire component surface.

According to a preferred embodiment of the fireproof covering according to this invention, the mineral wool components have outwardly bent, flange-like borders extending at least along the longitudinal ledges. The mineral wool components can also have, in plan view, substantially rectangular plates, all of the edges or borders of which are constructed in flange-like manner and bent outwardly. The longitudinal edges are preferably bent at an angle of 45°, so that the individual components can be easily assembled into duct covers of rectangular or square cross-section, in which the flange-like borders of the components engage with one another over a large area, which helps to provide a mutual seal. The edges, which can be connected to the corresponding edge of a further component for extending duct, can be bent by an angle of 90°.

In the case of the fireproof covering according to this invention, angle and/or corner pieces can be provided, which cover the areas adjacent to the covering edges or corners, preferably in a width corresponding to at least double the covering wall thickness, thereby insuring a good seal of the corner areas. At least certain of the components can have a tray and/or trough-like construction for producing covered ducts.

The mineral wool components of the covering according to this invention can, as stated above, incorporate a metal foil layer. However, instead of such a layer, or in addition thereto, the components can have a metal netting reinforcement, preferably arranged in the center or inner path of the wall. Such a metal reinforcement has a double function, namely the stabilization of the covering and increasing the insulating action of the covering, due to the fact that it distributes heat laterally, reducing the effect of local hot spots.

The mineral wool components can have recesses, particularly stamped portions for the mounting and fixing correspondingly shaped fastening and support elements.

The individual mineral wool components are preferably interconnected under contact pressure. Preferably, disks or clips are used, being arranged on either side of interconnected mineral wool components or panels and pressed against the latter by fastening elements such as screws and nuts. The mineral wool components or panels according to this invention are solid, hard, self-supporting structural elements which can not only be glued together, but can also be connected by means of nails, screws and bolts. It is also possible to provide plates or rails, which preferably extend over the entire connecting area and uniformly distribute the contact pressure of interconnected mineral wool components. The connecting areas can be in different planes and can be constructed in labyrinth-like manner.

The aforementioned metal foil preferably extends over the entire covering area of the associated component and is preferable incorporated to the latter prior to the setting of the binder. Preferably, the metal foil does not extend to the edges or borders of the mineral wool components, so that their contact faces and at least the edges and borders on the surface are free from metal foil. This reduces heat conduction through the metal foil to the interior of the duct.

The fireproof covering according to the invention can be in the form of one or several layers, particularly for the covering area. The multi-layer construction is advantageous in several respects. Firstly, the covering can be formed from thinner and consequently more readily deformable individual elements. Secondly, intermediate layers can be provided between the individual mineral wool components. Such an intermediate layer is preferably formed from a thin metal foil. In addition to such a foil, or in place thereof, it is also possible to provide a separate fireproof coating. Thirdly, sealing problems can be significantly reduced by a reciprocal displacement (staggering) of the components adjacent to the connecting areas.

The mineral wool of the components preferably has a bulk density between 200 kg/m$^3$ and 700 kg/m$^3$, preferably between 300 kg/m$^3$ and 600 kg/m$^3$.

The individual layers can be formed by identically shaped mineral wool components, at least in the corner and edge areas. The inner layer preferably has a higher density than the outer layer, so that the covering remains effective even if its outer layer is subjected to high thermal loads.

At temperatures of about 900° C. the mineral wool has a tendency to sinter. However, even at such high temperatures, heat penetration can be prevented for a sufficiently long time if the density of the outer layer is matched to an optimum thermal insulation, while an inner more highly compacted layer fulfills the supporting function. The higher temperatures are then no longer likely to penetrate the inner layer.

The softening point of the mineral wool components is preferably above 900° C. Such components preferably comprise: 42% to 50% by weight of $SiO_2$; 12% to 18% by weight of $Al_2O_3$; 12% to 20% by weight of CaO; 8% to 15% by weight of MgO; and, 4% to 10% by weight of iron oxides. The average diameter of the mineral wool fibers of the mineral wool components is preferably between 2 μm and 6 μm.

The binder used in producing the mineral wool components is preferably a thermal setting polymer, and in particular, a phenolic or formaldehyde resin. The proportion of binder to mineral wool can be in the range of 1.5% to 8% by weight, and is preferably in the range of 2% to 6% by weight. Suitable binders may be chosen from the group consisting of phenol formaldehyde resin, urea formaldehyde resin and melamine formaldehyde resin.

The fireproof coating can be applied after the final fitting of the mineral wool components. However, it is preferably applied prior to fitting, including the areas of the contacting surfaces. It has proved particularly advantageous to use components provided on their contacting faces with an inflammable or not-readily flammable protective coating, and it is especially advantageous to join them together by an adhesive having such properties. The adhesive coating may comprise: 1% to 25% inorganic incombustible glass fibers; 10% to 50% terpolymer binder; 2% to 20% inert inorganic filling material; 5% to 15% plasticizer; 35% to 70% inorganic flame retarder; and be free of antimony compounds.

The mineral wool components for the assembly of a fireproof covering according to this invention are preferably constructed in such a way that they can be stacked upon one another, preferably without forming gaps, which greatly facilitates their transportation and storage.

The associated flanges of adjacent components preferably have a width which is at least double the wall thickness of the components.

According to a preferred embodiment, a supporting structure is provided, to which the components can be fixed. This supporting structure preferably comprises a plurality of vertically arranged frames, which are fixed to and surround cable troughs. These frames can comprise U-shaped rails and connecting bends are provided for the connection thereof. According to a preferred embodiment, the frames comprise in each case four flat iron straps, interconnected by means of connecting bends connecting the flat iron straps of the individual frames. The flat strap irons and the connecting bends are provided with screw holes, which are preferably in the form of elongated slots. If necessary, the individual frames can be additionally interconnected by rails running parallel to the cable, the rails also being provided with screw holes. The mineral wool boards or plates can be fixed to the supporting structure by retaining members which are inserted through or into the plates and which in each case are associated with a securing member.

According to a preferred embodiment, the mineral wool plates are fixed by means of fastening elements which can be pressed into the end face thereof and screwed to the supporting structure. The fastening elements have in each case two legs, one of which has a terminal tip which can be pressed into a mineral wool plate and the other of which has an elongated slot used for threaded attachment to the supporting structure. The strength of the structure elements is so high that screws can be threaded into the structural elements and fixed therein. A metal screw of 40 mm. in length and 5 mm. in diameter, as is usually used for wood, was screwed into a structural element 30 mm. deep. The screw was inserted parallel to the fiber direction and then loaded with 15 kg. in a pulling test. No changes in the position of the screw in the structural element were apparent during several days of testing with variations in temperature of from approximately +70° C. to −40° C. (+158° F. to −40° F.). A pulling force of 32 kg. was necessary to remove the screw from the structural element.

Connecting elements can be provided for the purpose of fixing the mineral wool plates together, which elements are anchored in recesses in the plates. These connecting elements can be constructed in a strap or spring-like manner. The connecting elements are preferably made from asbestos cement and can be fixed by an adhesive, such as the self-quenching fireproofing agent disclosed in U.S. Pat. No. 3,642,351.

The protective coating on the mineral wool components preferably consists of a mechanically strong and weatherproof material.

A further embodiment of the invention is a cable duct held by supports. The channel is formed like a through-bore or chute in which cables may be placed. The upper inner structural element is simply placed on the upper edge of the side walls of the duct to insulate the cable duct. The lower inner structural element can be fixed to the upper inner structural element by means of nails. Following this, the upper outer structural element, which is correspondingly larger, can be put in place and the lower outer structural element can be screwed to the upper outer structure element. Thus, no additional supporting elements are necessary. The longitudinal joints of the inner structural elements lie in the corners of the L-shaped cross-section of the outer structural elements and are therefore covered. The cross-sectional joints of the inner structural elements are also covered by the outer structural elements. The cross-sectional joints of the outer structural elements are covered by a sleeve of sheet metal which is provided in two parts, and therefore mechanically strengthens the structure.

Although the structural elements are made of compressed mineral wool, the covering of the cable ducts offers good insulation. It is possible with a one layer covering, with structural elements of 30 mm. thick, that objects in the interior of the ducts can be protected for at least 30 minutes against fire (F30). A double-layered construction will provide protection for objects inside the duct for at least 60 to 90 minutes (F60 to F90). The F values are established according German Norm DIN 4102, which in principle corresponds with ISO R 834 or ASTM E 119.

It is an important advantage of this invention that coverings according to the invention can be retrofitted to existing cable ducts in such a way that no additional support structure is necessary. Duct inserts for supporting cables and the like can also be easily provided.

Preferably at least one molded mineral wool component of the fireproof covering or the fireproof duct has at least one 90° right angle in cross section.

Preferably at least one molded mineral wool component has an L-shaped cross section or a U-shaped cross section. The molded mineral wool components are shaped advantageously from a flat mat of high thickness and low density by compressing under heat to the desired shape, thickness and density. If the fireproof covering or duct consist of more than one layer the different layers are preferably of different thickness and density, whereby layer with the higher thickness has preferably the lower density. The layer with higher density has preferably a density of 400 to 700 kg/m$^3$ and the layer of lower density has preferably a density of 200 to 400 kg/m$^3$. The thickness of the thinner layer is preferably 10 to 15 mm and the thickness of the thicker layer is preferably 30 to 50 mm. At least one part of the layer with lower density is U-shaped or L-shaped in cross section and may be combined with a flat or shaped cover. The parts of the layer of high density may or may not be shaped in cross section.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 20 is a side elevation of another embodiment of a fireproof covering according to this invention, including duct supports.

FIG. 21 is a section view taken along the line XXI—XXI in FIG. 20.

FIG. 22 is a front elevation of the fireproof covering and support structure shown in FIG. 20.

FIG. 26 is a perspective view of another embodiment of the fireproof duct for electrical cables.

FIGS. 27, 27a and 27b show the construction of a curve of the embodiment of FIG. 26.

FIGS. 28, 28a, 28b and 28c show details of the embodiment of FIG. 27.

FIG. 29 shows the construction of the corner of the embodiment of FIG. 26.

DETAILED DESCRIPTION OF THE PREFERRED EMBODIMENTS

This invention is described through reference to many embodiments of the invention, each of which shares the novel and nonobvious characteristics which distinguish the invention over the prior art. The various embodiments incorporate and illustrate adaptive features, which in many instances, can be advantageously incorporated into many other of the embodiments. It is simply not possible to illustrate each and every adaptive feature in conjunction with each and every embodiment.

Figure 1:
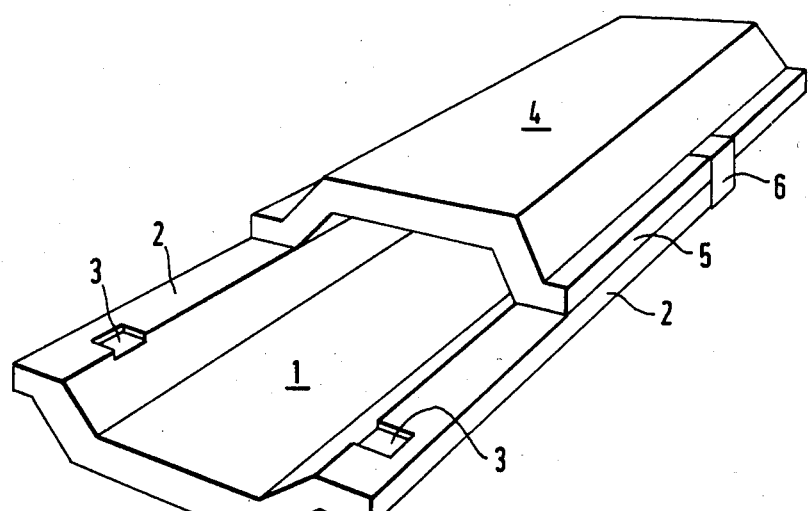
FIG. 1 is a perspective view of a portion of a preferred embodiment of a fireproof covering according to this invention.

A portion of a preferred embodiment of a fireproof covering according to this invention is shown in FIG. 1. The covering has a substantially U-shaped component 1 formed from molded mineral wool material. Component 1 has a downwardly directed side, as the drawing is oriented, with a fireproof coating, and is arranged in such a way that its flange-like borders 2 are located in a horizontal plane. Sidewalls sloping at an angle of approximately 45° are connected onto and pass into a planer base. The base width corresponds essentially to three times the component depth. The flange-like borders 2 have equidistantly facing stamped recesses 3 into which the lateral ends of cable clips can be inserted. These cable clips can in each case be formed from a straight web, but can also have undulating depressions for receiving individual cables. Thus, the cables are carried by the components and are surrounded on all sides by air in duct so formed. A separate supporting structure for the cables is unnecessary.

The trough formed by a plurality of successively arranged components 1 is covered by a plurality of successively arranged components 4, only one of which is shown in FIG. 1 for purposes of facilitating the explanation.

The shape and dimensions of the components 4 correspond to those of the components 1. They are also made from molded mineral wool material and have on their outside, that is, the side directed upwardly in the drawing, a fireproof coating. The borders 5 of components 4 rest on the borders 2 of component 1 and are displaced or staggered with respect to the underlying components in a manner similar to that in which brick walls are constructed. Metal clips 6 having a U-shaped cross-section are provided at the transition points between the components 1 and 4, which are clipped onto the borders 2 and 5. However, in some instances, it has proved advantageous to provide separate fastening elements, for example screws, in place of the clips 6.

Figure 2:
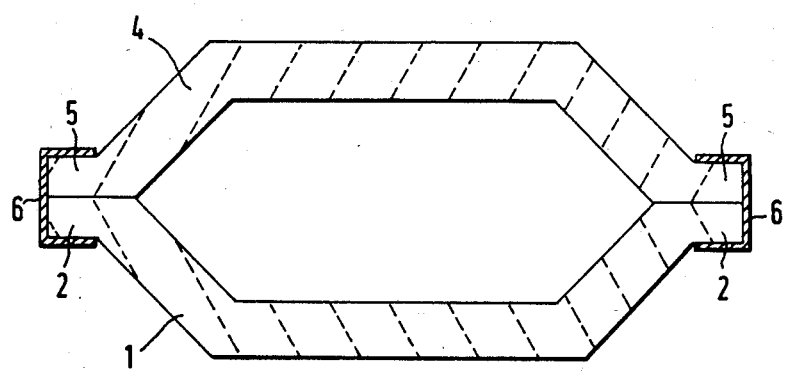
FIG. 2 is a cross-section through the fireproof covering shown in FIG. 1.
Figure 3:
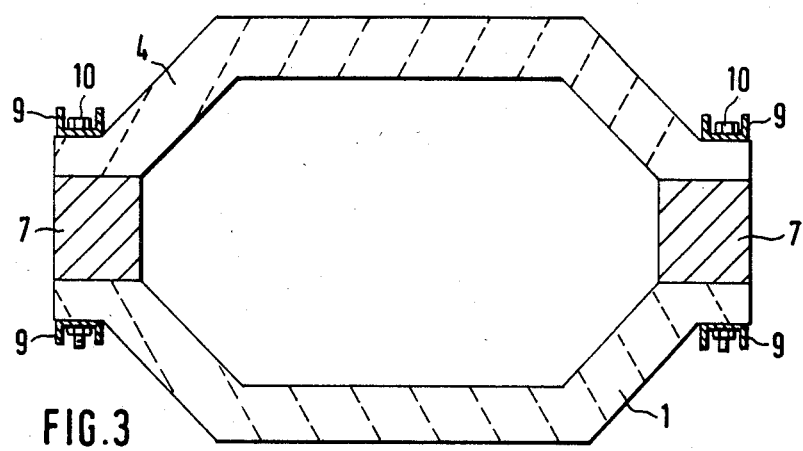
FIGS. 3 to 5 illustrate other embodiments of fireproof coverings according to this invention, in cross-section.
Figure 4:
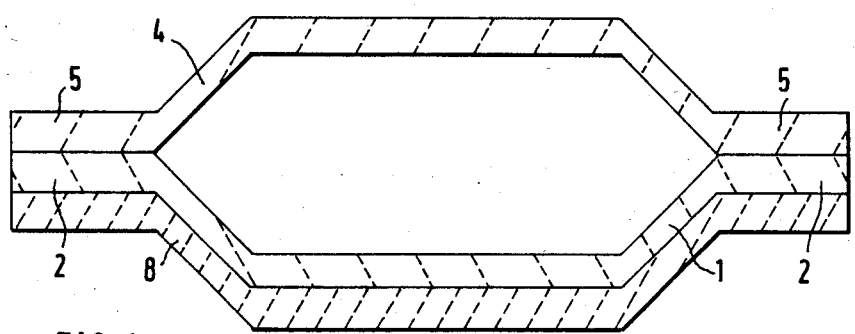
Figure 5:
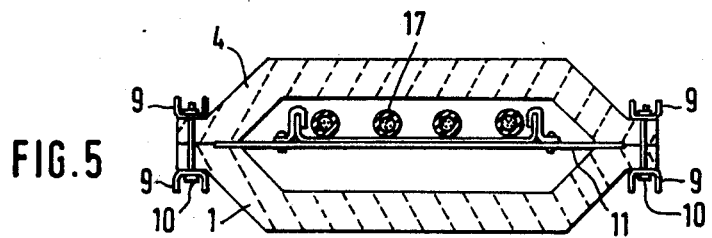

FIGS. 3 to 5 illustrate cross-sections through alternative embodiments of fireproof coverings according to this invention, although each essentially corresponds to that shown in FIGS. 1 and 2, in that each comprises successively arranged lower components 1 and upper components 4. In the embodiment of FIG. 3, ledge or strip-like intermediate pieces 7 are disposed between the lower components 1 and the upper components 4, serving as spacers. In the embodiment of FIG. 4, successively arranged components 8 are provided beneath the lower components 2 and tightly engage on the latter and are displaced relative thereto, as may be seen more clearly in FIG. 10. Thus, the fireproof covering of the embodiment of FIG. 4 is in double-layer form in the lower area.

The fireproof coverings shown in FIGS. 3 and 5 are provided with U-shaped rails 9 and fastening screws 10 for fixing the upper components 4 to the lower components 1 and/or 8. The base of each U-shaped rail 9 rests on the edge or border of the component and is preferably longer than the latter, so that they may also be used for simultaneously fixing a plurality of successively arranged components to one another. The rails extend over the entire length of the fireproof duct.

The spacer 7 of the embodiment of FIG. 3 and the components 8 of the embodiment of FIG. 4, each of which is disposed below an upper component 1, are in each case preferably made from a molded mineral wool material, provided at least on the outside with a fireproof coating.

Figure 9:
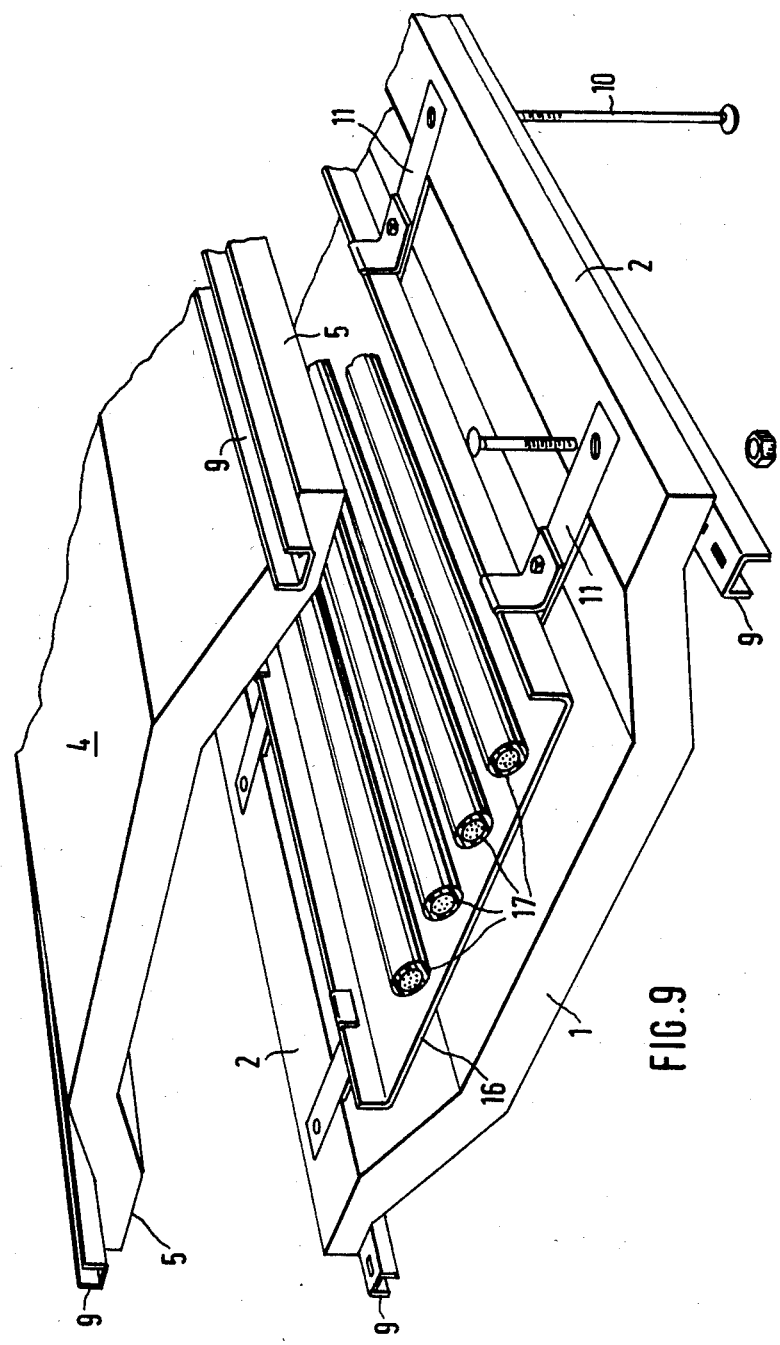

The embodiment of FIG. 9 illustates that the fastening screws can, if desired, also pass through cable clips 11. However, in order to avoid the formation of heat bridges, it is preferable to make the clips 11 shorter, so that they do not come into contact with the fastening screws 10, as illustrated in the embodiment of FIG. 5.

In the embodiment of the fireproof covering shown in FIG. 4, it is possible to provide a separate fireproof coating between components 1 and the underlying components 8. This makes it possible to provide a thin metal foil 21, for example an aluminum foil, between the two component layers. Such a metal foil can also be embedded in components 1, 4 and 8, providing additional reinforcement for the components and additional sealing against gas and liquid penetration.

In each case, the individual components 1, 4 and 8 are preferably profiled in such a way that they can be stacked or nested inside of one another, in the same way as the components 1 and 8 are shown in cross-section in FIG. 4. This considerably facilitates the transportation and storage of such components.

Figure 6:
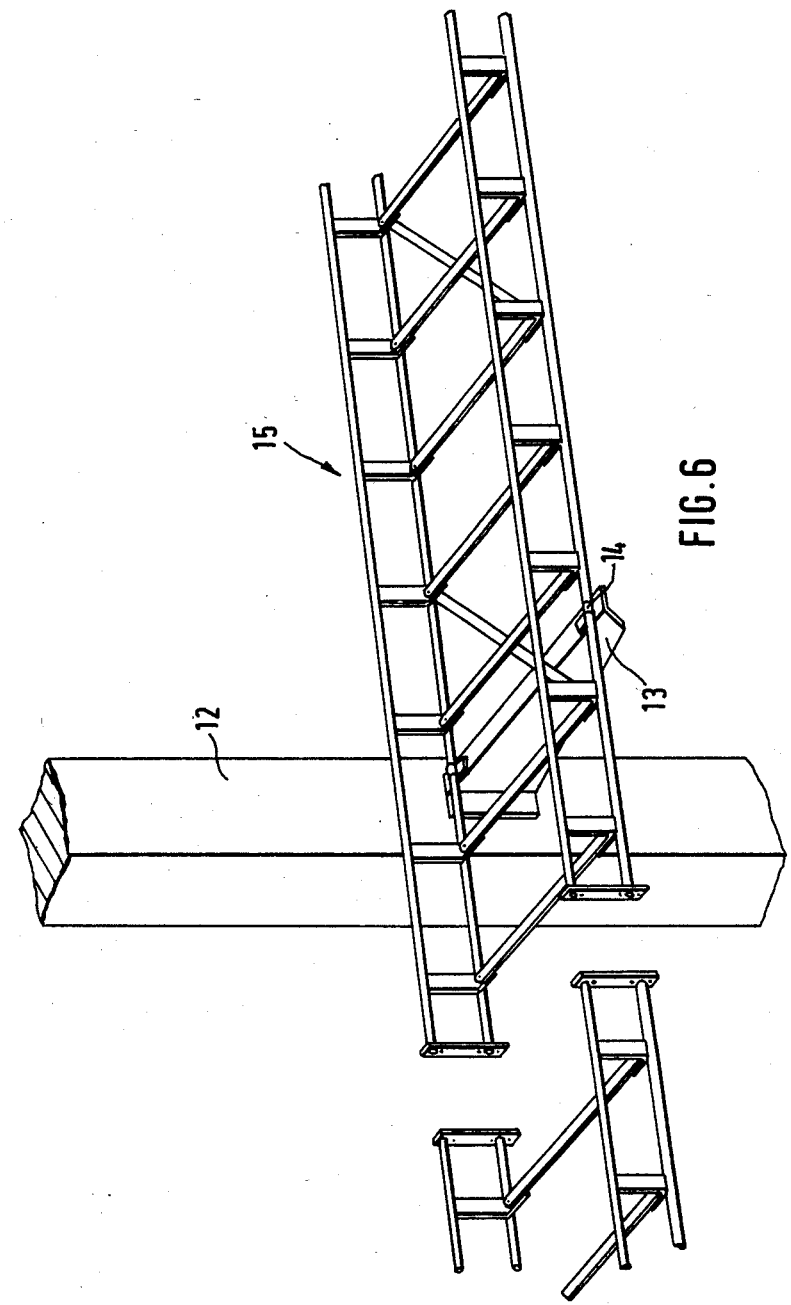
FIGS. 6 to 9 illustrate successive stages for the fitting of a fireproof covering according to this invention.
Figure 7:
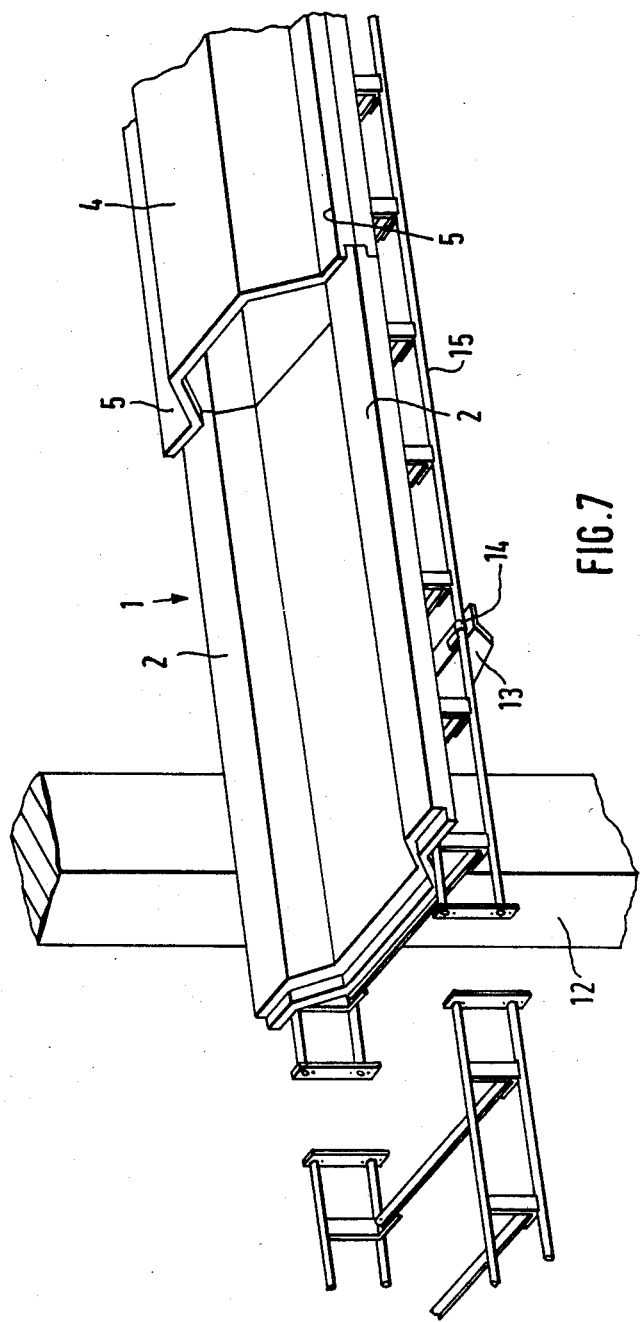
Figure 8:
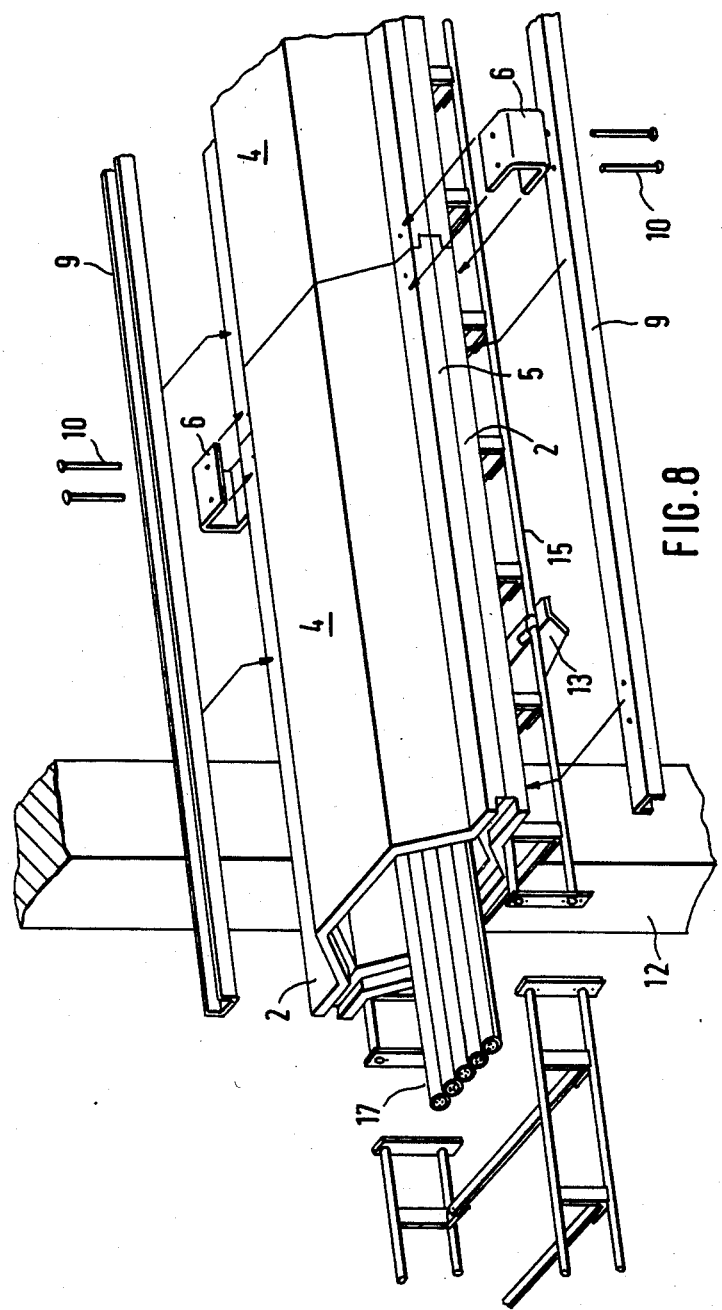

FIGS. 6 to 9 show how a fireproof covering according to this invention can be fitted or installed. FIG. 6 shows a column post 12 onto which a bracket 13 is fixed. A substantially ladder-shaped frame 15, comprising a plurality of individual segments which can be screwed together at their end faces is fixed to the bracket 13 by means of clamps 14. A layer of successively arranged, lower components 1 is placed from above onto frame 15 as shown in FIG. 7. The lower components 1 can have cooperating profiles for mutual sealing purposes. The same also applies with respect to the upper components 4, which can be subsequently placed on the borders 2 of the lower components 1 if loose cabling, that is cabling without cable clips, is desired in the duct formed by the lower components 1 and the overlying components 4. After installing the upper components 4, metal clips 6 may be fitted as shown in FIG. 8. After the metal clips 6 have been fitted, the U-rails 9 may be attached by fastening screws 10. Cables can be laid in prior to the application of the upper components 4, or can be subsequentially drawn through the duct thereafter.

If cable clips 11 are used, as shown in FIG. 9, they must be inserted prior to attachment of the upper components, fitting into the stamped recesses provided in the lower components 1. The individual clips 11 can be interconnected before or after by means of a trough 16, preferably made from sheet metal, into which the cable 17 to be protected may be laid. The troughs are then covered by upper components 4. As can also be seen in FIG. 9, lower rails 9 can be attached by separate screws than those which fix upper rails 9 to the upper components 4. With this arrangement, the upper components 4 can be raised if necessary, without having to disassemble the lower rails 9.

Figure 10:
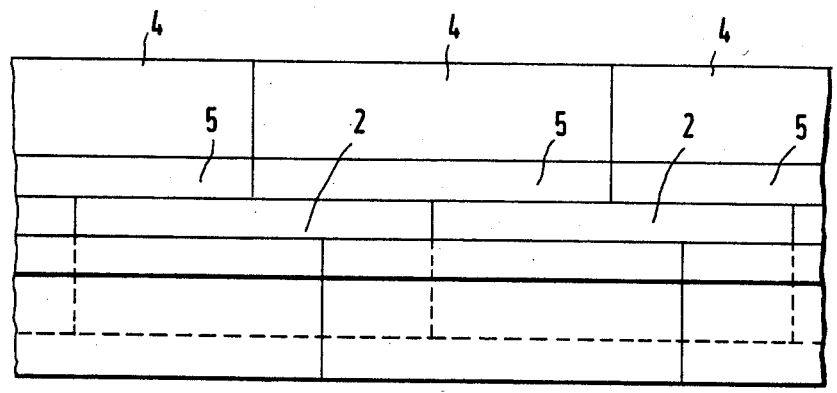
FIG. 10 illustrates a cutaway portion of the fireproof covering of FIG. 4, shown from the side.

FIG. 10 illustrates the manner in which the individual components 1, 4 and 8 of the embodiment shown in FIG. 4 are preferably arranged in a displaced or staggered manner with respect to one another.

Figure 11:
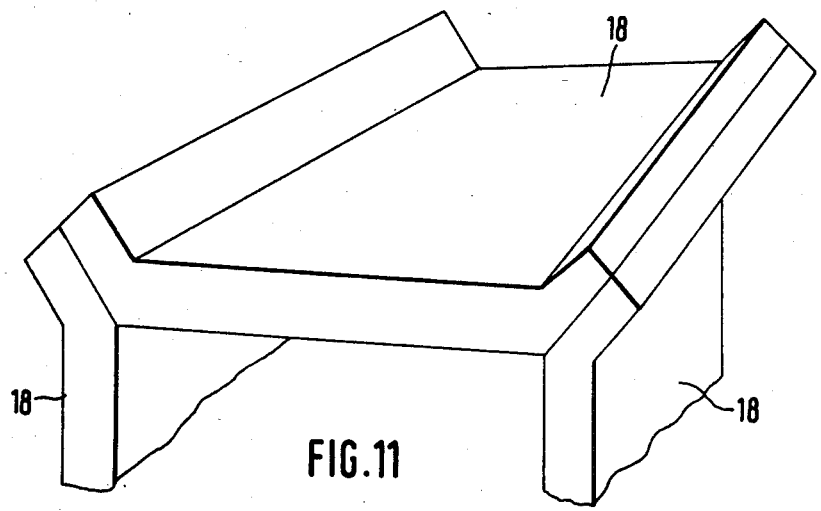
FIG. 11 is a partial perspective view of another embodiment of a fireproof covering according to this invention.

FIG. 11 is a partial perspective view of a fireproof covering comprising four components 18, which like components 1, 4 and 8, can also be rigid and formed from a molded mineral wool material. At least on the outside, the components 18 also have a fireproof coating. Borders of component 18 are bent over outwardly in flange-like manner, so that they tightly engage with the border flange of the adjacent component and can be interconnected by means of clips corresponding to clips 6 and/or U-rails 9. In still another embodiment which is not illustrated in the drawings, but which is structurally analogous to that shown in FIG. 11, the fireproof covering comprises individual components, all of whose border edges are bent outwardly, so that the edges of adjacent succeeding components in the longitudinal direction of the covering engage one another and can be interconnected by means of the clips and/or the U-rails.

Coverings according to this invention can also be used for protecting objects other than cables, particularly constructional components, for example, steel supports, as well as for the protection of hydraulic control and supply lines.

Figure 12:
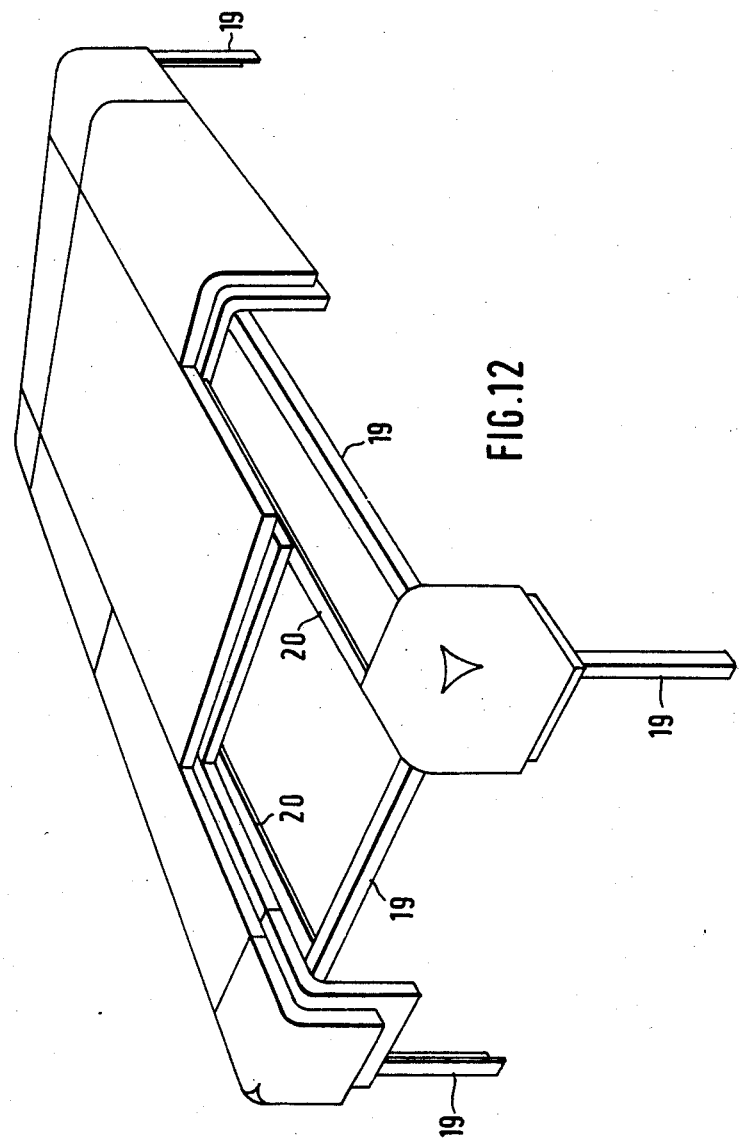
FIG. 12 is a partial perspective view of yet another embodiment of a fireproof covering according to this invention, as equipped with a supporting structure.

The embodiment shown in FIG. 12 comprises a supporting structure of individual rails 19 and 20, to which the individual components can be fixed. The components comprise two-layered corner, edge and plate-like intermediate pieces.

Figure 13:
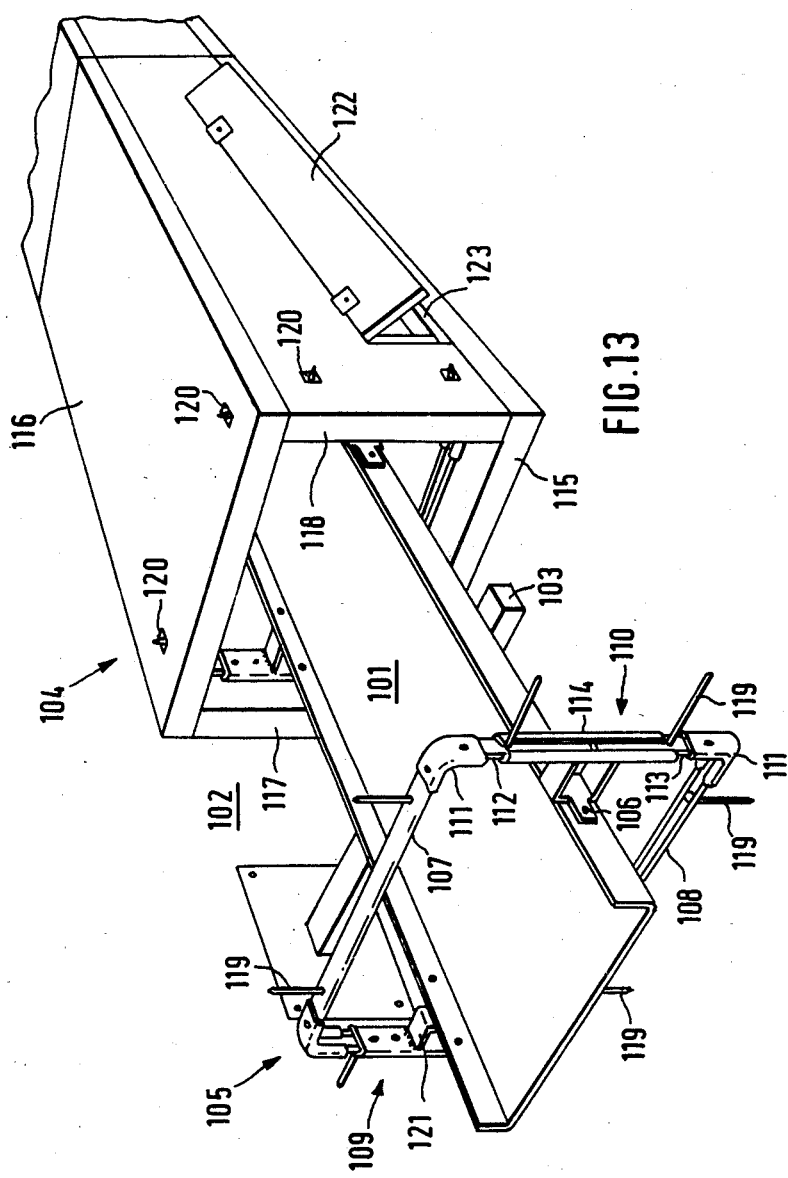
FIG. 13 is yet another embodiment of a fireproof covering according to this invention, shown in perspective.

The embodiment of the fireproof covering shown in FIG. 13 is a protective device for a cable route in which a cable trough 101 is provided for a plurality of juxtaposed cables and which is secured to a support 103 fixed to a wall 102. The protective device comprises a protective cover 104 fixed to vertically directed frames 105, which are in turn fixed to the cable trough 101, preferably by means of screws 106 using intermediate pieces 121.

Each of the frames 105 comprises two horizontally directed rails 107, 108, two vertically directed rails 109, 110 and four connecting bends 111, which connect the horizontal rails 107, 108 to the vertical rails 109, 110. Each of the rails 107 through 110 can comprise a plurality of mutually axially adjustable parts, so that they can be adapted to the particular volume proportions. In the drawing, only the two vertical rails 109, 110 are shown in multipart form. In each case, they comprise two short rail portions 112, 113 and a central portion 114 in which portions 112, 113 are axially displaceable and secured by means of connecting elements, for example screws.

The protective cover 104 has a rectangular cross-section, its walls consisting of joined-together planar mineral wool plates approximately 30 mm to 80 mm thick, and preferably 50 mm thick, namely a base plate 115, a top plate 116 and two side plates 117, 118.

In the embodiment, plates 115 through 118 are shown in multipart form, i.e. they comprise a plurality of rectangular individual plates, whose narrow sides abut. For fixing plates 115 through 118 to the frames 105, fastening elements 119 are provided, which are essentially in nail-like form.

The following procedure is adopted for assembling plates 115 through 118. Firstly, a base plate 115 is fixed to two frames 105 by means of in each case two fastening elements 119, which are driven through the plate from the inside of the frame. The protruding ends of the fastening elements 119 can then be secured by clamping disks 120 or by bending over. When base plate 115 has been fixed to the two frames 105, it is possible to fix the two side plates 117, 118 to the two frames 105, for which purpose fastening elements 119 are again used. However, before this takes place, the ends of side plates 117, 118 facing base plate 115 are preferably coated with a heat-resistant adhesive containing inorganic fibers with a melting point of 700° C. to 800° C., and being free of antimony compounds.

A suitable adhesive coating preferably comprises, by weight: 1% to 25% inorganic, incombustible fibers; 10% to 50% binder; 2% to 20% inert, inorganic filling material; 5% to 15% plasticizer; and 35% to 70% inorganic flame retarder. The inorganic, incombustible fibers may be glass chosen from the group consisting of soda-lime glass, potash-lime glass, and boron-alumina glass, each with a melting point in the range of 700° C. to 800° C. The binder may be a terpolymer, made from monomeres chosen from the group consisting of vinyl alcohol, vinyl chloride, vinyl acetate, ethylene, propylene, styrene, methacrylic acid, methacrylic acid methyl ester, butadiene and vinyl laurate. The inert, inorganic filling material may be chosen from the group consisting of calcium carbonate, titanium dioxide, quartz sand, calcium sulfate and barium sulfate. The plasticizer may be chosen from the group consisting of diisotridecylphthalate, di-2-ethylhexylphthalate, diphenylcresylphosphate, trioctylphosphate, orthophosphoric acid-tri-(2-chlorethyl)ester and tributylphosphate. The flame retarder may be chosen from the group consisting of aluminiumhydroxide, hydrated aluminiumphosphate and hydrated zeolite.

It is also possible to use additional connecting elements, which can be in strap or spring form and are associated with the recesses or slots in base plate 115 for fixing the side plates 117, 118 to the base plate. When the two side plates 117, 118 are assembled, it is possible to start with the assembly of top plate 116, which is performed in the same way.

The structure formed from two frames 105, base plate 115, two side plates 117, 118 and a top plate 117 forms a unitary component, which can be prefabricated in the factory or, if desired, assembled on site. On site, this component can be terminally joined to other, correspondingly constructed components. In addition to or in place of a heat-resistant adhesive, it is possible to use connecting elements constructed in dowel pin, strap or spring-like manner and for which correspondingly dimensioned receptacles must be provided in the adjacent component.

The fireproof covering according to the invention has the advantage that it can be retrofitted, for example to existing cable routes and can also be used when they are laid for the first time. The covering is characterized by a particularly good insulating action. Construction is easy and no special supports are required for the frames 105 during the assembly thereof.

The protective cover 104 and preferably the two side plates 117, 118 can be provided with ventilating flaps 122 ensuring a good circulation and ventilation of the protective cover interior and consequently the cooling of the cables inserted therein. The ventilating flaps 122 can be directly articulated to the protective cover plates. However, it is also possible to articulate them onto frame-like inserts 123, which can be fixed in correspondingly dimensioned plate recesses. The ventilating flaps 122 and the optionally associated inserts 123 are preferably made from a heat-resistant hard material, more specifically mineral wool plates, in whose production a cement-like binder is used.

Figure 14:
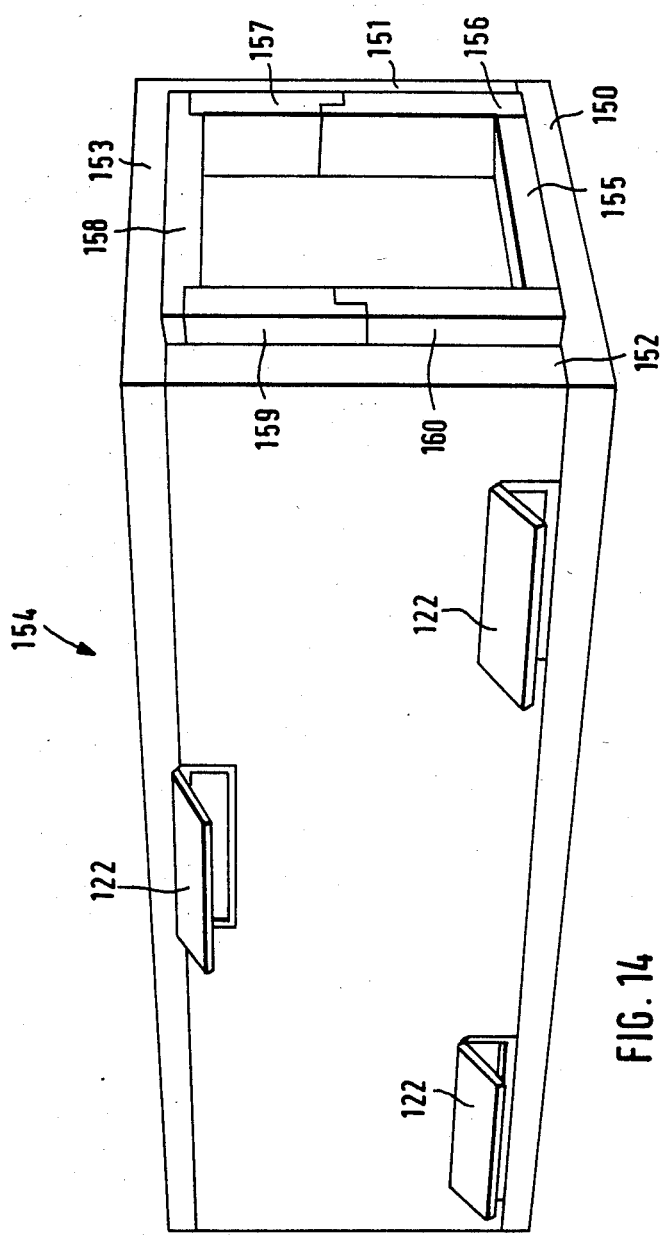
FIG. 14 is a partial perspective view of a portion of a fireproof covering according to this invention illustrating interlocking structure of inner panels.

FIG. 14 shows a portion 154 of a cable covering having a base plate 150, two side plates 151, 152 and a top plate 153 and which can be terminally connected to correspondingly constructed and dimensioned portions. In order to bring about a tight terminal connection between adjacent portions 154, the individual portions have on one end face in each case an inner frame, which can be terminally inserted into the adjacent portion. The frame comprises individual strips 155 through 160, preferably made from the same material as plates 150 through 153 of the individual cable covering portions 154.

Figure 15:
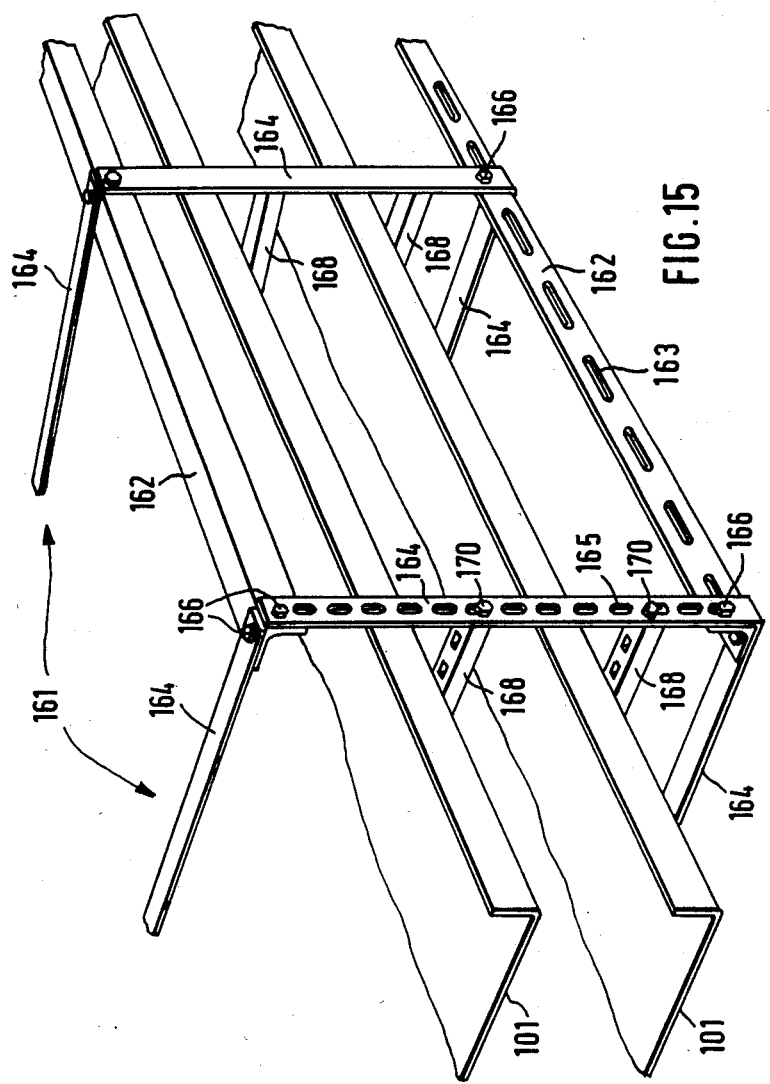
FIG. 15 illustrates the supporting structure of the fireproof covering shown in FIG. 14.
Figure 17:
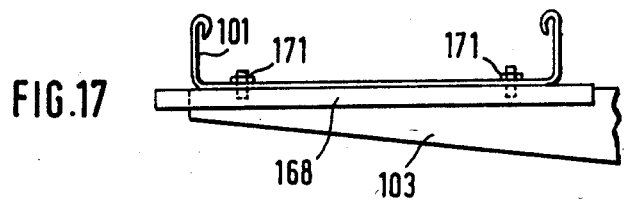
FIG. 17 illustrates a first assembly stage of the supporting structure shown in FIG. 15.
Figure 18:
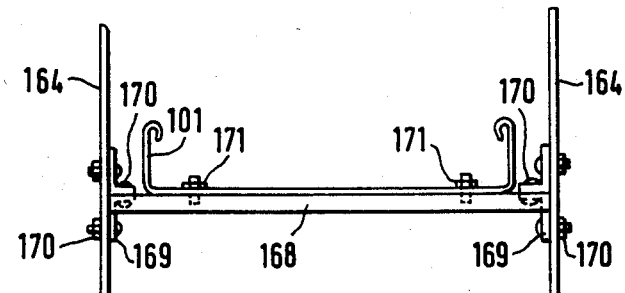
FIG. 18 illustrates a second assembly stage of the supporting structure shown in FIG. 15.

Unlike the embodiment of FIG. 13, the supporting structure associated with plates 150 to 153 can advantageously comprise individual frames 161 (see FIG. 15) interconnected by means of angle rails 162, provided with elongated slots 163. In the embodiment of FIG. 15, the frames 161 in each case comprise four flat strap irons 164, which are also provided with elongated slots 165 and are attached by screws 166 to angle rails 162. Downwardly directed U-shaped bearing rails 168 are provided between the two vertically directed flat strap irons 164, and are fixed to straps 164 by bends 169 and screws 170 (See FIG. 18). Bearing rails 168 are attached by screws 171 to the bottom of the cable trough (See FIG. 17).

Figure 16:
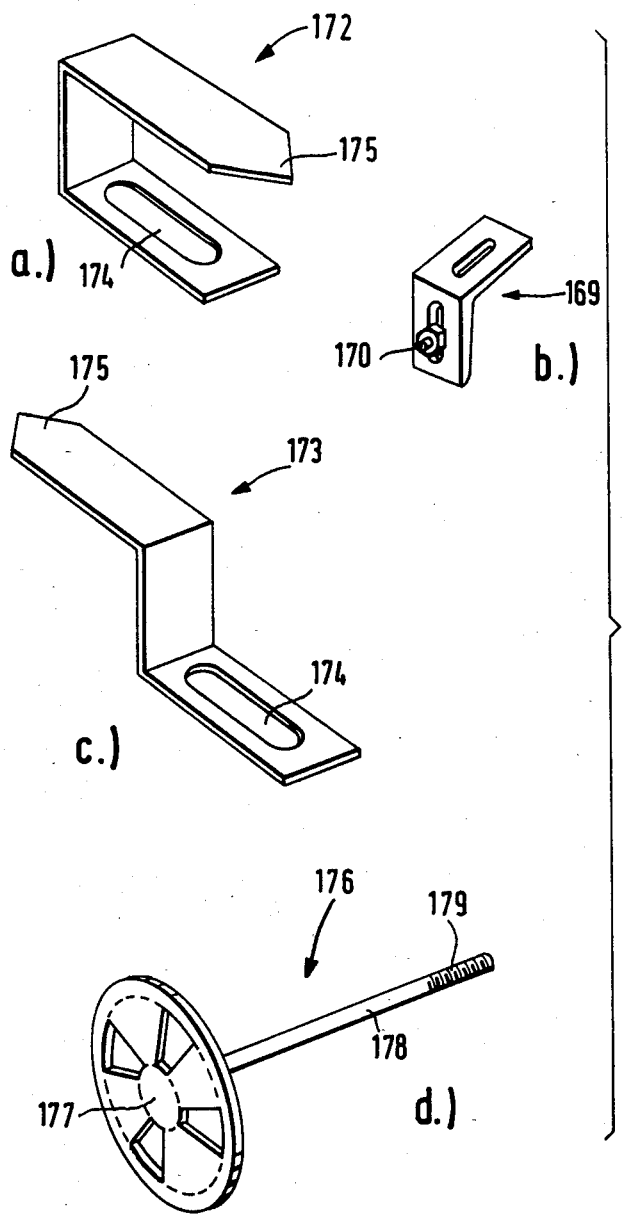
FIG. 16 illustrates various embodiments of fastening elements used in the assembly shown in FIG. 14.

Unlike the embodiment of FIG. 13, the cover plates 150 to 153 can be fixed to the supporting structure by means of fastening elements 172, 173 screwed to the latter and which are terminally pressed into the said plates. FIGS. 16a and 16c show such fastening elements 172, 173 made from a stable sheet metal and having an essentially U or Z-like configuration. In each case, they have a member provided with an elongated slot 174 by means of which they can be fixed to the supporting structure, while also having a member provided with a tip 175. As a result of such fastening elements, the following procedure can be adopted for assembling the cover plates. Firstly, a plurality of the U-shaped fastening elements 172 are screwed to the lower angle irons 163 of the supporting structure in such a way that the member provided with a top 175 is directed upwards. When this has taken place, a side plate 151 or 152 can be introduced into the tips 175 of fastening elements 172 from above. The substantially Z-shaped fastening elements 173 can then be used for fastening to frame 161 and/or to the vertical rails 164 of frame 161. The tips of elements 173 are to be pressed into the end faces of the plates, followed by the screwing of elements 173 to frame 161. In addition to the substantially U or Z-like fastening elements 171, 173, it is also possible to use for plate fixing purposes through-fastening elements, an embodiment of which is shown in FIG. 16d. Fastening element 176 in FIG. 16d has a large and substantially disk-shaped head 177, to which a shank 178 is fixed. At the free end of shank 178, there is a thread 179, onto which a nut can be screwed, after previously inserting shank 178 with thread 179 through a cover plate and an elongated slot in the supporting structure.

Figure 19:
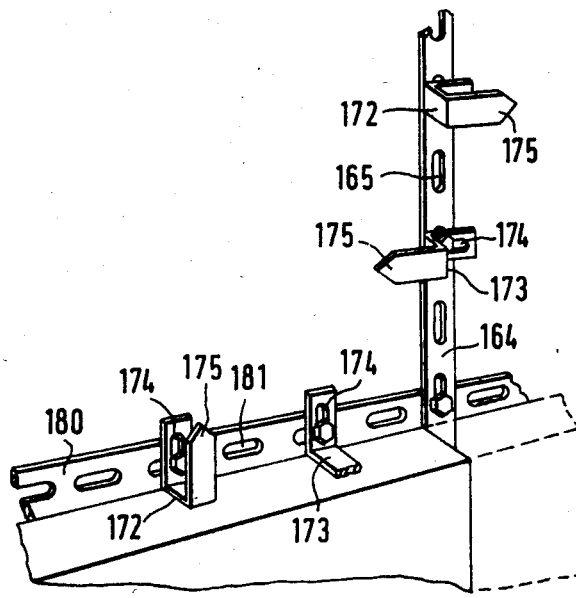
FIG. 19 is a partial perspective view illustrating the manner in which the cover plate is fixed to the supporting structure.

In the case of the supporting structure of FIG. 15, if necessary, the individual frames 161 are not only interconnected by angle rails 162, but also by parallel perforated rails 180 (See FIG. 19) having elongated slots 181, which contribute to the stabilization of the supporting structure and are preferably always provided if the individual cover plates are formed by plates juxtaposed in the longitudinal direction of the cover.

A further embodiment of the invention, which relies in particular upon the ability of the mineral wool components to form a secure seat for conventional fasteners, such as nails and screws. A fireproof covering in the form of a cable duct 24 is shown in FIGS. 20, 21 and 22. The duct 24 is held between two supports 26, in the nature of those supports described hereinbefore. The duct 24 comprises inner and outer structural elements, each of which has a L-shaped cross-section as shown in FIG. 21. An upper, inner structural element 28 is joined to a lower, inner structural element 30 so as to form a closed chute or channel therebetween. Two metal side wall brackets 36 and 38 run between supports 26, the cable duct being constructed therearound. The inner structural elements are connected to one another by common nails 40. The inner structural elements are surrounded and covered by an upper, outer structural element 32 and a lower, outer structural element 34. It will be appreciated that the respective seams of the inner and outer structural elements are at opposite corners of the rectangular-cross-section of the cable duct. The outer structural elements are connected to one another by common screws 42.

With reference to FIG. 20, the cable duct is formed by a plurality of inner and outer structural elements, extending in the desired direction. The inner structural elements abut one another at joints 54 and the outer structural elements abut one another at joints 56. It will be appreciated that these joints are also staggered relative to one another in order to enhance sealing of the cable duct. The joints 54 are well covered by the outer structural elements. The joint 56 of the outer structural elements is covered and reinforced by a sleeve 44, comprising two L-shaped brackets 46 and 48. Each of the brackets 46 and 48 have angled flanges 50, whereby the sleeve brackets may be attached to one another by nut and bolt assemblies 52. No additional supporting elements are necessary.

The inner and outer structural elements may be constructed from the same mineral wall panels or covers utilized in the other embodiments disclosed herein. The inner and outer brackets are preferably sheet metal.

Certain applications may require shorter durations of heat resistance, in which case fireproof coverings of only one layer will suffice, wherein a moisture-proof putty, which produces a coal-foam coating under fire conditions, is packed into and fills the transverse and longitudinal joints of the mineral wool components for sealing the joints. Such an intumescent putty should be weatherproof, and preferably comprises, by weight: 10% to 50% binding agent; 0.1% to 10% inert, inorganic filling material; 0.5% to 5% thicknener; 3% to 12% inorganic fiber; 5% to 15% plasticizer; and, 25% to 60% active filling material.

The binding agent may be a terpolymer made from monomeres chosen from the group consisting of: vinyl alcohol, vinyl chloride, vinyl acetate, ethylene, propylene, styrene, methacryl acid, methacryl acid methyl ester, butadiene and vinyl laurate. The inert, inorganic filling material may be chosen from the group consisting of calcium carbonate, titanium dioxide, calcium sulfate, aluminium silicate and barium sulfate. The thickener may be chosen from the group consisting of pyrogenic silicic acid, hydroxyethylcellulose and hydroxymethylcellulose. The inorganic fiber may be a glass fiber chosen from the group consisting of soda-lime glass, potash-lime glass and boron-alumina glass. The plasticizer may be chosen from the group consisting of diphenylcresylphosphate, tributylphosphate, orthophosphoric acid-tri-(2-chlorethyl)ester and trioctylphosphate. The active filling material may be chosen from the group consisting of melamine, melamin-phosphate, dimelaminpyrophosphate, corn starch, pentaerythrite, dipentaerythrite and cellulose.

This invention may be embodied in other specific forms without departing from the spirit or essential attributes thereof. Accordingly, reference should be made to the appended claims, rather than to the foregoing specification, as indicating the scope of the invention.

Figure 23:
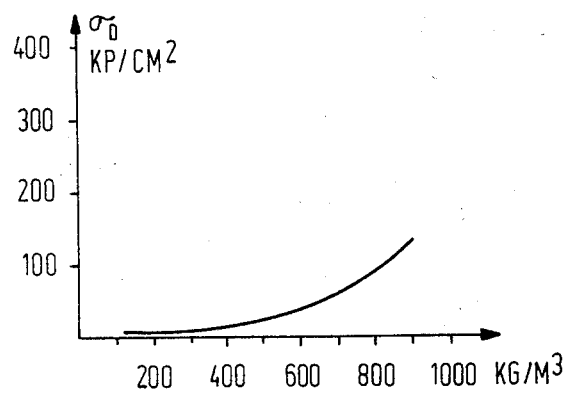
FIG. 23 is a diagram of the bending strength.
Figure 24:
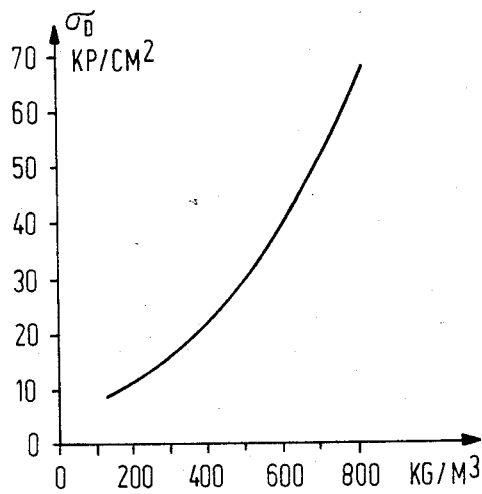
FIG. 24 is a diagram of the tensile strength.
Figure 25:
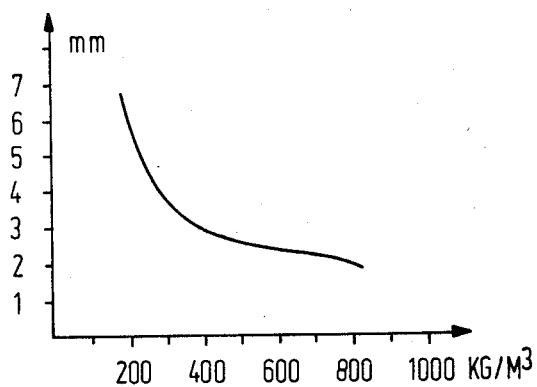
FIG. 25 is a diagram of the depth of indentation with a conus of 90°.

FIGS. 23 and 24 show that the bending strength and tensile strength are increasing more than proportional in comparison with the density. Therefore, according to a preferred embodiment it is provided a combination of a fireproof covering or fireproof duct of two layers of different density, whereby the more dense layer provides more strength and the less dense layer provides more heat insulation. Applicant has found that the depth of indentation beginning with a density of about 300 kg/m$^3$ and above is decreasing less (see FIG. 25). Therefore, the fireproof mineral wool components have advantageously a density of at least 300 kg/m$^3$, whereby the less dense as well as the more dense fireproof mineral wool components may be used on the outer surfaces. Surprisingly it has been found that a fireproof mineral wool component with increasing binding agent content has an increasing heat stability. Therefore, the binding agent content is preferably at least 3% per weigth and especially 4 to 5 and more percent. This is surprising, because the binding agent is combustible and decomposes when heat is applied. The fireproof mineral wool components with L-shaped cross sections are used preferably for the covering of already mounted cables, whereas fireproof mineral wool components with U-shaped cross sections are preferably used as ducts for cables and other heat sensible objects which are laid into the duct of the fireproof mineral wool components after they have been arranged. The U-shaped components can also be used for covering of already mounted objects such as for cables which are mounted transversely along a wall, whereby objects can wholly be covered by the U-shaped components.

FIGS. 26 to 29 show the various possibilities of a channel or duct system made of two different layers of fireproof mineral wool components. A series of U-shaped components 200 of mineral wool are arranged one behind another on two angle bars 201 which are mounted transversely on supporting means 202 of vertical carriers 203. The U-shaped components 200 are covered with cover panels 204. The cover panels and the U-shaped components have the same thickness of 30 mm and a density of 300 kg/m$^3$. Their length is 900 mm. Their width is 400 mm. The interior surfaces of the so formed channel are lined with flat mineral wool components of a thickness of 10 mm and of a density of 600 kg/m$^3$. The length of the panels is 1500 mm. The flat panels 205 are inserted into the channel in such a way that the joints of the U-shaped components are covered on the inner side by the flat panels. The flat panels are fixed to the inner surfaces of the U-shaped components and their covers by means of pins of metal (not shown). However, they can also or additionally be bonded to the U-shaped components by means of an adhesive. The inner surface of the flat panels 205 at the bottom of the U-shaped component may have transversely ribs or corrugations in order to provide a free distance between the objects to be inserted and the bottom of the channel.

FIGS. 27 to 29 show the possibilities of a construction system of this embodiment to provide a curve of 90° by means of two angles of 45° (angles of 30° or different angles are possible, too).

The end of the U-shaped components may be cut along preprinted lines 206. There are provided angle pieces of 45° and 30° resp. of the flat insert components 207 and 208 which can be used to cover the cut joints 206 of the bottom and the cover of the channel inside. FIG. 28 shows side wall inserts 209 and 210 of the flat material with angles of 45° and 30° resp. for covering the vertical joints of the U-shaped components, too.

FIG. 29 shows the possibility of a 90° angle of the channel. For the covering of the joints at the inner and outer corner of the angle there may be used sections 211 and 212 of the U-shaped components which are insered additionally (212) or in substitution (211) of corresponding pieces of U-shaped components 200.

What is claimed is:

1. A fireproof covering structure for protecting heat-sensitive material and structures, said covering comprising:
   pre-shaped mineral wool components, molded with a binder to be rigid, attachable and substantially self-supporting in the form of upper and lower rigid component members, the upper and lower component members together including at least two bent portions, such that a sealed trough may be formed therebetween for surrounding the heat-sensitive material and structure; and,
   a fireproof coating at least on the outside of the rigid mineral wool components, the coating progressively sintering onto the surface of the rigid mineral wool components under fire conditions and protecting the components as the binder progressively decomposes, whereby heat-sensitive material and structure can be protected from fire conditions for extended periods of time.

2. A fireproof covering according to claim 1, wherein at least some of the pre-shaped mineral wool components are molded into rigid forms having a bend in at least one direction.

3. A fireproof covering according to claim 1, wherein the mineral wool components are molded by compression.

4. A fireproof covering according to claim 1, wherein the mineral wool components comprise gas and liquid impermeable layers.

5. A fireproof covering according to claim 4, wherein the impermeable layer is a metal foil.

6. A fireproof covering according to claim 4, wherein the impermeable layer is a heat-resistant adhesive between overlapping layers of the mineral wool components.

7. A fireproof covering according to claim 1, wherein the lower component members each have at least two bent portions, and the upper component members are substantially flat.

8. A fireproof covering according to claim 7, wherein at least one of the upper and lower component members comprises at least two layers of pre-shaped mineral wool component members.

9. A fireproof covering according to claim 8, wherein the at least two layers are joined by a gas and liquid impermeable adhesive layer.

10. A fireproof covering according to claim 7, comprising a plurality of the mineral wool components arranged end to end to form an elongated, insulated duct.

11. A fireproof covering according to claim 10, wherein the mineral wool components are arranged to form inner and outer insulating layers.

12. A fireproof covering according to claim 11, wherein the seams between adjacent mineral wool components arranged in the outer layer are staggered with respect to the seams of adjacent mineral wool components of the inner layer, enhancing mechanical strength and heat impermeability.

13. A fireproof covering according to claim 1, wherein the molded mineral wool components have a bulk density in the range of approximately 200 kg/m$^3$ to 700 kg/m$^3$.

14. A fireproof covering according to claim 1, wherein the binder for the mineral wool components comprises a formaldehyde resin in an amount in the range of 1.5% to 8%, by weight, chosen from the group consisting of phenol formaldehyde resin, urea formaldehyde resin and melamine formaldehyde resin.

15. A fireproof covering according to claim 1, wherein mating surfaces of adjacent mineral wool components are joined by a not-readily flammable adhesive coating containing inorganic fibers with a melting point in the range of approximately 700° C. to 800° C. and being free of antimony compounds.

16. A fireproof coating according to claim 15, wherein the adhesive coating comprises;
   1% to 25% by weight of inorganic, incombustible glass fibers;
   10% to 50% by weight of a terpolymer binder;
   2% to 20% by weight of inert, inorganic filling material;
   5% to 15% by weight of a plasticizer; and
   35% to 70% by weight of inorganic flame retarder.

17. A fireproof covering according to claim 1, further comprising a moisture-proof intumescent putty for sealing joints between adjacent mineral wool components, which forms a coal-foam coating under fire conditions.

18. A fireproof covering according to claim 1, wherein the molded mineral wool components are pre-shaped to forms which can be nested inside one another without substantial gaps there between, facilitating storage and transportation of the components.

19. A fireproof covering according to claim 1, further comprising supporting structural members for the mineral wool components.

20. A fireproof covering according to claim 1, wherein at least one molded mineral wool component has at least one 90° angle in cross section.

21. A fireproof covering according to claim 1, wherein at least one molded mineral wool component has an L-shaped cross section.

22. A fireproof covering according to claim 1, wherein at least one molded mineral wool component has a U-shaped cross section.

23. A fireproof covering according to claim 1, wherein at least one molded mineral wool component is made from a flat mat of higher thickness and lower density by heat compressing and simultaneously molding to the desired shape.

24. A fireproof covering according to claim 1, comprising at least two layers of molded mineral wool components of different density.

25. A fireproof covering according to claim 24, wherein different layers are of different thickness.

26. A fireproof covering according to claim 24, wherein the layer with the higher density has a lower thickness.

27. A fireproof covering according to claim 24, wherein the layer with the higher density has a thickness of 10 to 15 mm and the layer of the lower thickness has a thickness of 30 to 50 mm.

28. A fireproof covering structure for protecting heat-sensitive material and structures, said covering comprising:
pre-shaped mineral wool components, molded with a binder to be rigid, attachable and substantially self-supporting, the mineral wool components having rigid flange-like borders extending outwardly at an angle, the borders being rigidly attachable along their lengths for connecting coextensive lengths of the components to one another into an enclosure for surrounding the heat-sensitive material and structures; and,
a fireproof coating at least on the outside of the rigid mineral wool components, the coating progressively sintering onto the surface of the rigid mineral wool components under fire conditions and protecting the components as the binder progressively decomposes, whereby heat-sensitive material and structure can be protected from fire conditions for extended periods of time.

29. A fireproof covering according to claim 28, further comprising a plurality of clips for connecting the components to one another, by pressably engaging the flange-like borders of connected components.

30. A fireproof covering according to claim 28, wherein the components are connected to one another by rails of U-shaped cross section attached to the flange-like borders of components rigidly connected to one another end to end.

* * * * *